United States Patent
Kachare et al.

(10) Patent No.: US 12,010,170 B2
(45) Date of Patent: Jun. 11, 2024

(54) METHODS AND APPARATUS FOR PEER-TO-PEER DATA CHANNELS FOR STORAGE DEVICES

(71) Applicant: Samsung Electronics Co., Ltd., Suwon-si (KR)

(72) Inventors: Ramdas P. Kachare, Pleasanton, CA (US); Sompong Paul Olarig, Pleasanton, CA (US); Matthew Shaun Bryson, Los Gatos, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 17/728,969

(22) Filed: Apr. 25, 2022

(65) Prior Publication Data

US 2022/0255991 A1 Aug. 11, 2022

Related U.S. Application Data

(63) Continuation of application No. 16/885,249, filed on May 27, 2020, now Pat. No. 11,316,917.
(Continued)

(51) Int. Cl.
*G06F 15/177* (2006.01)
*G06F 3/06* (2006.01)
(Continued)

(52) U.S. Cl.
CPC ........ *H04L 67/1042* (2013.01); *G06F 3/0604* (2013.01); *G06F 3/061* (2013.01);
(Continued)

(58) Field of Classification Search
CPC ............... H04L 67/1042; H04L 67/104; H04L 67/1097; H04L 45/02; H04L 47/10;
(Continued)

(56) References Cited

U.S. PATENT DOCUMENTS 5,408,473 A 4/1995 Hutchison et al.
6,810,491 B1 * 10/2004 Yamamoto .......... G06F 11/2069
714/6.32
(Continued)

FOREIGN PATENT DOCUMENTS

EP 3010163 A2 4/2016

OTHER PUBLICATIONS

Final Office Action for U.S. Appl. No. 16/885,249, dated Oct. 5, 2021.
(Continued)

*Primary Examiner* — Richard G Keehn
(74) *Attorney, Agent, or Firm* — Renaissance IP Law Group LLP

(57) ABSTRACT

A method may include transferring data between a host and a first storage device through a first storage interface, transferring data between the host and a second storage device through a second storage interface, and transferring data between the first storage device and the second storage device through a peer-to-peer channel. A storage system may include a host interface, a first storage device having a first storage interface coupled to the host interface, a second storage device having a second storage interface coupled to the host interface, and a peer-to-peer bus coupled between the first and second storage devices. A storage device may include a storage medium, a storage device controller coupled to the storage medium, a storage interface coupled to the storage device controller, and a peer-to-peer interface coupled to the storage device controller.

20 Claims, 14 Drawing Sheets

Related U.S. Application Data

(60) Provisional application No. 62/985,312, filed on Mar. 4, 2020.

(51) Int. Cl.
*G06F 13/40* (2006.01)
*H04L 41/0813* (2022.01)
*H04L 45/02* (2022.01)
*H04L 47/10* (2022.01)
*H04L 67/104* (2022.01)
*H04L 67/1042* (2022.01)
*H04L 67/1097* (2022.01)

(52) U.S. Cl.
CPC .......... *G06F 3/0614* (2013.01); *G06F 3/0646* (2013.01); *G06F 3/067* (2013.01); *G06F 3/0683* (2013.01); *G06F 13/4022* (2013.01); *H04L 41/0813* (2013.01); *H04L 45/02* (2013.01); *H04L 47/10* (2013.01); *H04L 67/104* (2013.01); *H04L 67/1097* (2013.01)

(58) Field of Classification Search
CPC ..... H04L 41/50; H04L 41/0813; H04L 41/12; G06F 3/0604; G06F 3/061; G06F 3/0614; G06F 3/0646; G06F 3/067; G06F 3/0683; G06F 13/4022; G06F 13/124; G06F 13/4068
See application file for complete search history.

(56) References Cited

U.S. PATENT DOCUMENTS

| | | |
|---|---|---|
| 7,076,169 B2 | 7/2006 | Shpantzer et al. |
| 7,133,380 B1 | 11/2006 | Winters et al. |
| 8,705,741 B2 | 4/2014 | Voruganti et al. |
| 8,995,540 B2 | 3/2015 | To et al. |
| 9,021,563 B2 | 4/2015 | Ying et al. |
| 9,146,695 B2* | 9/2015 | Galloway ............... G06F 3/065 |
| 9,755,729 B2 | 9/2017 | Seel |
| 10,430,333 B2* | 10/2019 | Li .......................... G06F 3/0607 |
| 10,911,292 B1 | 2/2021 | Bshara et al. |
| 2002/0091898 A1* | 7/2002 | Matsunami ............. G06F 3/067 710/316 |
| 2008/0256183 A1* | 10/2008 | Flynn .................... G06F 3/0688 711/E12.04 |
| 2009/0125671 A1* | 5/2009 | Flynn .................. G06F 11/1008 711/170 |
| 2014/0258598 A1 | 9/2014 | Canepa et al. |
| 2016/0357468 A1 | 12/2016 | Hathom et al. |
| 2018/0024830 A1 | 1/2018 | Kannan et al. |
| 2019/0034306 A1* | 1/2019 | Wysocki ............... G06F 11/2094 |
| 2019/0056951 A1* | 2/2019 | Gschwind ............. G06F 9/3842 |
| 2019/0102293 A1* | 4/2019 | Li ........................... G06F 3/065 |
| 2019/0155777 A1* | 5/2019 | Shim ..................... G06F 3/0613 |
| 2019/0245794 A1 | 8/2019 | Kalman et al. |
| 2019/0250852 A1 | 8/2019 | Kabra et al. |
| 2019/0294565 A1 | 9/2019 | Pinto et al. |
| 2020/0042208 A1 | 2/2020 | Roberts |
| 2020/0042215 A1 | 2/2020 | Roberts |
| 2020/0042390 A1* | 2/2020 | Roberts ............... G06F 11/2094 |
| 2020/0137150 A1 | 4/2020 | Chatley et al. |
| 2020/0183827 A1 | 6/2020 | Dreier et al. |
| 2021/0173588 A1 | 6/2021 | Kannan et al. |

OTHER PUBLICATIONS

Notice of Allowance for U.S. Appl. No. 16/885,249, dated Dec. 29, 2021.

Office Action for U.S. Appl. No. 16/885,249, dated Jun. 23, 2021.

European Office Action for Application No. 21159878.4, dated Sep. 19, 2023.

\* cited by examiner

METHODS AND APPARATUS FOR PEER-TO-PEER DATA CHANNELS FOR STORAGE DEVICES

CROSS-REFERENCE TO RELATED APPLICATION

This application is a continuation of U.S. patent application Ser. No. 16/885,249, filed May 27, 2020, which claims priority to, and the benefit of, U.S. Provisional Patent Application Ser. No. 62/985,312, filed Mar. 4, 2020 which are both incorporated by reference.

TECHNICAL AREA

This disclosure relates generally to data storage, and more specifically, to systems and methods for storing data in storage devices, datacenters, edge-centers and/or the like.

BACKGROUND

A storage system may include one or more storage devices such as hard disk drives (HHDs), solid state drives (SSDs), and/or the like, located in one or more chassis, racks, and/or the like. Data may be transferred between the storage devices and one or more local or remote hosts through a storage interface on each storage device and/or host. A storage device may be connected to a storage system by, for example, plugging a connector on the device into a corresponding connector on a midplane, switchboard, and/or the like. A storage system may also include a management component such as a baseboard management controller (BMC) which may perform configuration, monitoring, and/or other management functions for the storage system.

SUMMARY

A method may include transferring data between a host and a first storage device through a first storage interface, transferring data between the host and a second storage device through a second storage interface, and transferring data between the first storage device and the second storage device through a peer-to-peer channel. The method may further include discovering a topology of the peer-to-peer channel. Discovering the topology may be performed at least partially by one or more of the host, a management controller, or at least one of the storage devices. The method may further include configuring the first and second storage devices for Quality-of-Service (QoS). The storage devices may be configured for QoS by one or more of the host, a management controller, or at least one of the storage devices. The QoS may include one or more of a priority, a resource, or a performance level. The method may further include transferring data between the host and a third storage device through a third storage interface, and configuring the first, second and third storage devices as one or more peer-to-peer groups. A peer-to-peer group may be created dynamically. A peer-to-peer group may be configured for one or more of one-to-one, one-to-many, or many-to-many communication. At least one of the storage devices may perform at least one of a reliability, availability, or security function autonomously from the host.

A storage system may include a host interface, a first storage device having a first storage interface coupled to the host interface, a second storage device having a second storage interface coupled to the host interface, and a peer-to-peer bus coupled between the first and second storage devices. The peer-to-peer bus may include one or more of a wired bus, a wireless bus, or an optical bus. The first storage interface may be coupled to the host interface through a first storage connector, the second storage interface may be coupled to the host interface through a second storage connector, and the peer-to-peer bus is coupled between the first storage connector and the second storage connector. The peer-to-peer bus may include one or more passive connections. The peer-to-peer bus may include one or more active connections. The peer-to-peer bus may include a switch fabric. The peer-to-peer bus may be located at least partially on one of a midplane, a motherboard, or a switchboard. The first storage device may be coupled to the peer-to-peer bus through a first peer-to-peer connector, and the second storage device may be coupled to the peer-to-peer bus through a second peer-to-peer connector. The peer-to-peer bus may include one or more contacts arranged to couple the first peer-to-peer connector to the peer-to-peer bus. The one or more contacts may include one or more sliding contacts. The peer-to-peer bus may include one or more of a plate, a circuit board, a ribbon, or a cable. The system may be contained in an enclosure comprising one or more of a chassis, a rack, a room or a building.

A storage device may include a storage medium, a storage device controller coupled to the storage medium, a storage interface coupled to the storage device controller, and a peer-to-peer interface coupled to the storage device controller. The peer-to-peer interface may include one or more of a wired interface, a wireless interface, or an optical interface. The storage interface may include a two-port interface. The storage interface may be capable of loopback operation. The storage connector may be to the storage interface. The storage connector may be coupled to the peer-to-peer interface. The storage device may further include an additional connector coupled to the peer-to-peer interface. The additional connector may include one or more sliding contacts.

BRIEF DESCRIPTION OF THE DRAWINGS

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims. To prevent the drawing from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

DETAILED DESCRIPTION

In some embodiments according to this disclosure, two or more storage devices may exchange data through one or more peer-to-peer channels without directly involving a local and/or remote host. Such peer-to-peer data transfers may enable one or more of the storage devices to support, for example, Reliability, Availability, and Security (RAS) features, computational storage operations, and/or the like, while reducing or eliminating consumption of host interface bandwidth and/or interference with host traffic.

In some embodiments, one or more peer-to-peer channels may be implemented with wired, wireless, and/or other techniques. Any of these peer-to-peer channels may be arranged in one-to-one (1:1), one-to-many (1:N) and/or many-to-many (N:N) configurations, or any combinations thereof, and in static and/or dynamic configurations.

Some embodiments may implement topology and/or feature discovery, connection establishment, messaging flow control, Quality-of-Service (QoS) configuration and/or other features for storage devices that may exchange data through one or more peer-to-peer channels according to this disclosure.

Figure 1:
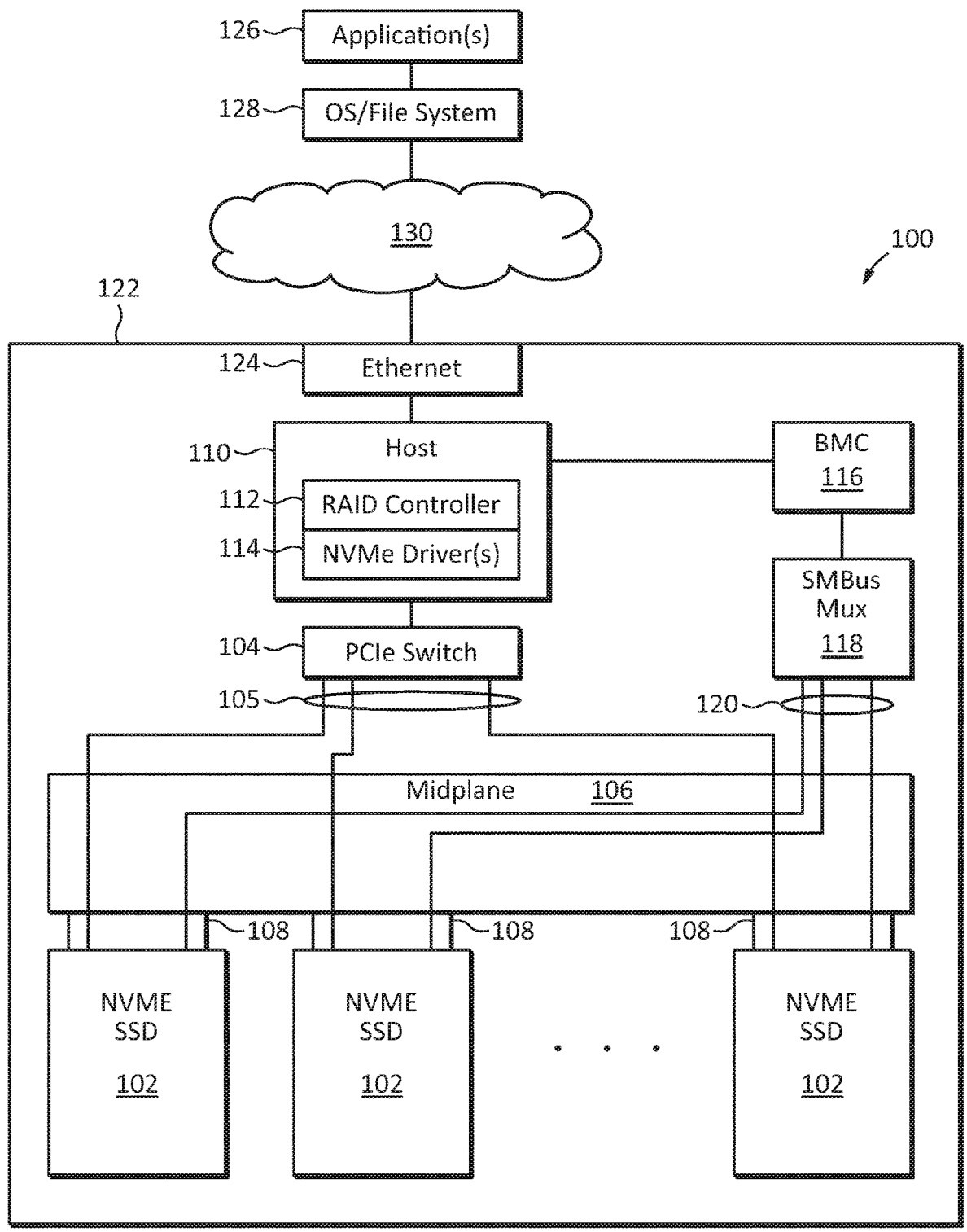
FIG. 1 illustrates an embodiment of a storage system according to this disclosure.

FIG. 1 illustrates an embodiment of a Direct Attached Storage (DAS) system according to this disclosure. The system 100 illustrated in FIG. 1 may include one or more storage devices 102, which may be implemented as SSDs having Non-Volatile Memory Express (NVMe) interfaces. The storage devices 102 may be communicatively connected to a Peripheral Component Interconnect Express (PCIe) switch 104 through PCIe links 105. The storage devices 102 may be connected to the PCIe switch 104 through a midplane 106 using, for example, storage connectors such as U.2 connectors 108. The PCIe switch 104 may connect the storage devices 102 to a host 110 which may implement various storage control functions. The host 110 may include, for example, a Redundant Array of Independent Drives (RAID) controller 112 and one or more NVMe drivers 114 for the storage devices 102.

The storage system 100 may further include a service processor such as a baseboard management controller (BMC) 116 to perform management and/or supervisory functions for the system 100. The BMC 116 may communicate with one or more of the storage devices 102 through a System Management Bus (SMBus) multiplexer 118, which may provide a management interface 120 to the storage devices 102 through the midplane 106 and storage connectors 108. The components of the storage system 100 may be housed in a chassis 122, a rack, a data room, or any other enclosure or space.

The storage system 100 may be accessible, for example, through a network interface 124 such as an Ethernet interface, which may provide access to one or more applications 126 and/or operating systems and/or file systems 128 through the Internet and/or any other cloud or network infrastructure 130. Although illustrated with a PCIe switch and links, the interconnect fabric may be implemented using any storage interconnect such as Serial Advanced Technology Attachment (SATA), Small Computer Systems Interface (SCSI), Serial Attached SCSI (SAS), and/or the like.

Figure 2:
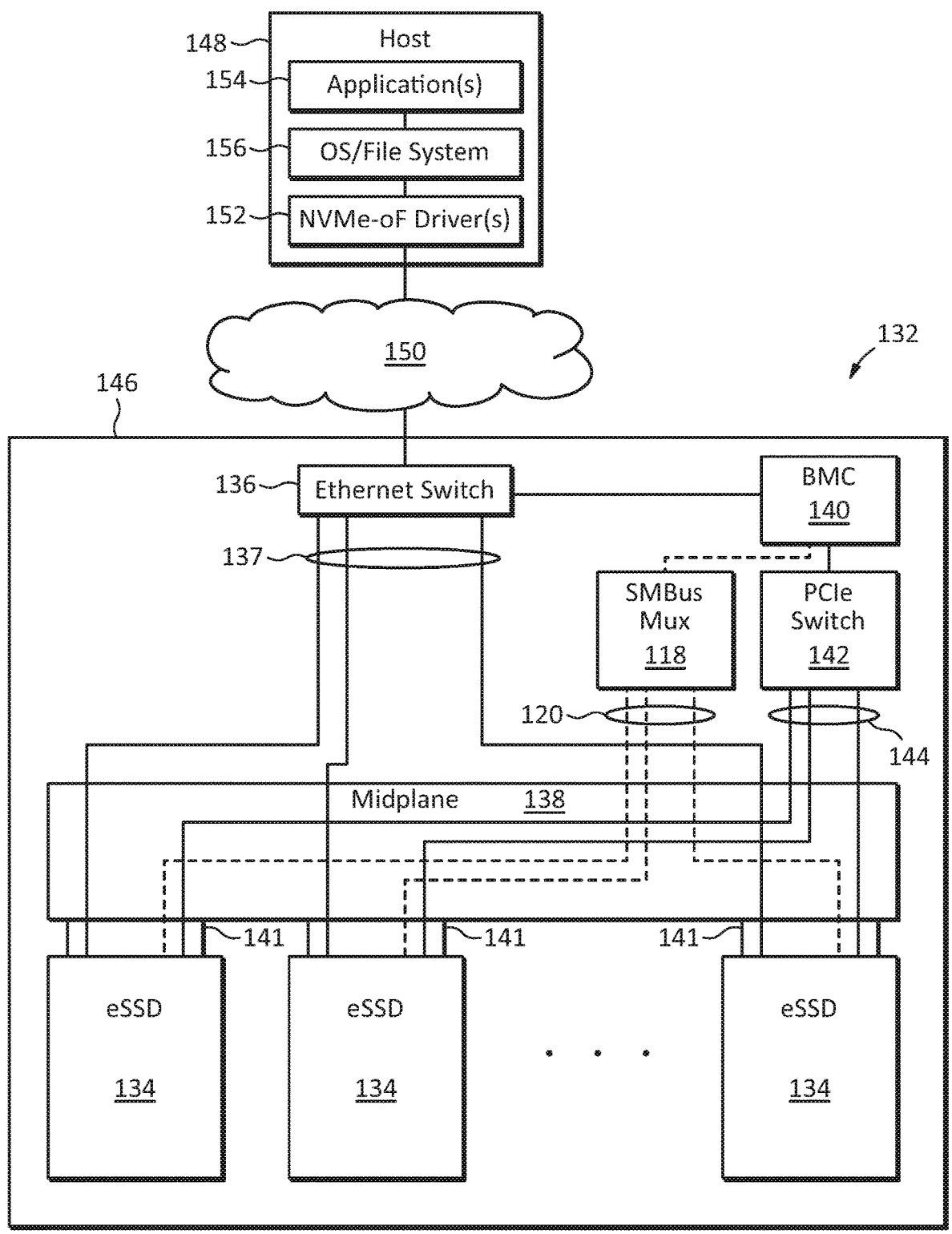
FIG. 2 illustrates another embodiment of a storage system according to this disclosure.

FIG. 2 illustrates an embodiment of a Remote Direct Attached Storage (rDAS) system according to this disclosure. The system 132 illustrated in FIG. 2 may include one or more storage devices 134, which may be implemented as Ethernet SSDs (eSSDs) having Non-Volatile Memory Express over Fabric (NVMe-oF) interfaces. The storage devices 134 may be communicatively connected to an Ethernet switch 136 through Ethernet connections 137. The storage devices 134 may be connected to the Ethernet switch 136 through a midplane 138 using, for example, storage connectors such as U.2 connectors 141. The midplane 138 may be implemented as a single circuit board, a group of smaller distributed circuit boards, or any other configuration.

As with the system 100 illustrated in FIG. 1, the system 132 illustrated in FIG. 2 may also include a service processor such as a BMC 140 which may perform management and/or supervisory functions for the system 132. In some embodiments, the BMC 140 may communicate with the storage devices 134 through a PCIe switch 142 to provide a management interface 144 to the storage devices 134 through the midplane 138 and storage connectors 141. The components of the storage system 132 may be housed in a chassis 146, a rack, a data room, or any other enclosure or space.

The Ethernet switch 136 may enable the storage system 132 to be accessed by a remote host 148 through, for example, the Internet and/or any other cloud or network infrastructure 150. The remote host 148 may include one or more NVMe-oF drivers 152 for the storage devices 134. The host may also include one or more applications 154 and an operating system and/or file system 156. Although illustrated with an Ethernet switch 136 and Ethernet connections, other network fabrics may be used in the storage system 132 such as Transmission Control Protocol/Internet Protocol (TCP/IP), User Datagram Protocol/Internet Protocol (UDP/

IP), Remote Direct Memory Access (RDMA), Fibre Channel, InfiniBand, and/or the like.

In some embodiments, because the storage devices 102 illustrated in FIG. 1 may be connected to a local host 110 which may include device drivers 114, and one or more storage management features such as the RAID controller 112, they may appear to function as a relatively cohesive and/or self-contained unit. In contrast, in some embodiments, the storage devices 134 illustrated in FIG. 2 may operate relatively independently of each other and thus may appear to a local or remote host as a pool of SSDs.

In some embodiments of storage systems, the implementation of one or more RAS features may involve one or more tradeoffs between reliability, cost, performance, and/or the like. For example, a data reliability technique based on data redundancy for recovering lost data from redundant data may involve one or more tradeoffs between a level of reliability, a degree of redundancy, a performance level, and/or the like. In some embodiments, data reliability may be achieved through replication and/or backup copies of data, for example, using a RAID controller or storage system software stack in a centralized manner. Offloading one or more RAS features, or a subset thereof, to a storage device for distributed implementation may help reduce the cost, complexity, performance bottlenecks, and/or the like. In some embodiments, one or more peer-to-peer data transfer techniques according to this disclosure may enable one or more storage devices to implement one or more RAS features without consuming host interface bandwidth, without involving a local and/or remote host, and/or the like.

In some embodiments of storage systems, the implementation of computational storage may also benefit from the use of peer-to-peer data transfers between storage devices according to this disclosure. Computational storage may involve offloading calculations from a central processing unit (CPU) to a storage device. In some computational storage use cases, one or more cost optimizations and/or performance benefits may be gained by processing raw data at a storage device and sending the results or reduced set of data to a host. However, in some computational storage cases, data may be striped or distributed across multiple storage devices for RAS purposes. Thus, in some embodiments, computational storage may involve accessing data on more than one storage device to which calculations have been offloaded. Thus, computational storage may involve transfer of data between storage devices.

Although data may be transferred between storage devices through host memory and/or switches in a host interface path, such transfers may consume host interface bandwidth, CPU attention, resources, and/or the like. Moreover, transferring data between storage devices through host memory and/or switches in a host interface path may lead to increased network infrastructure costs, energy consumption for data movement, performance bottlenecks, increased latencies, sub-optimal performance, and/or the like. In some embodiments, and depending on the implementation details, any number of these issues may be addressed by one or more side band techniques for peer-to-peer data transfers between storage devices according to this disclosure.

In some embodiments according to this disclosure, storage devices having peer-to-peer data transfer capabilities may be discovered, a peer-to-peer network topology may be established, and the storage devices may use, for example, a message transport connection through one or more peer-to-peer channels exchange data using messages. In some embodiments, one or more peer-to-peer data channel capabilities and/or data exchange techniques may be independent of one or more underlying storage architectures and/or protocols used between the storage devices and one or more local and/or remote hosts such as NVMe, NVMe-oF, DAS, RDAS, and/or the like.

Figure 3:
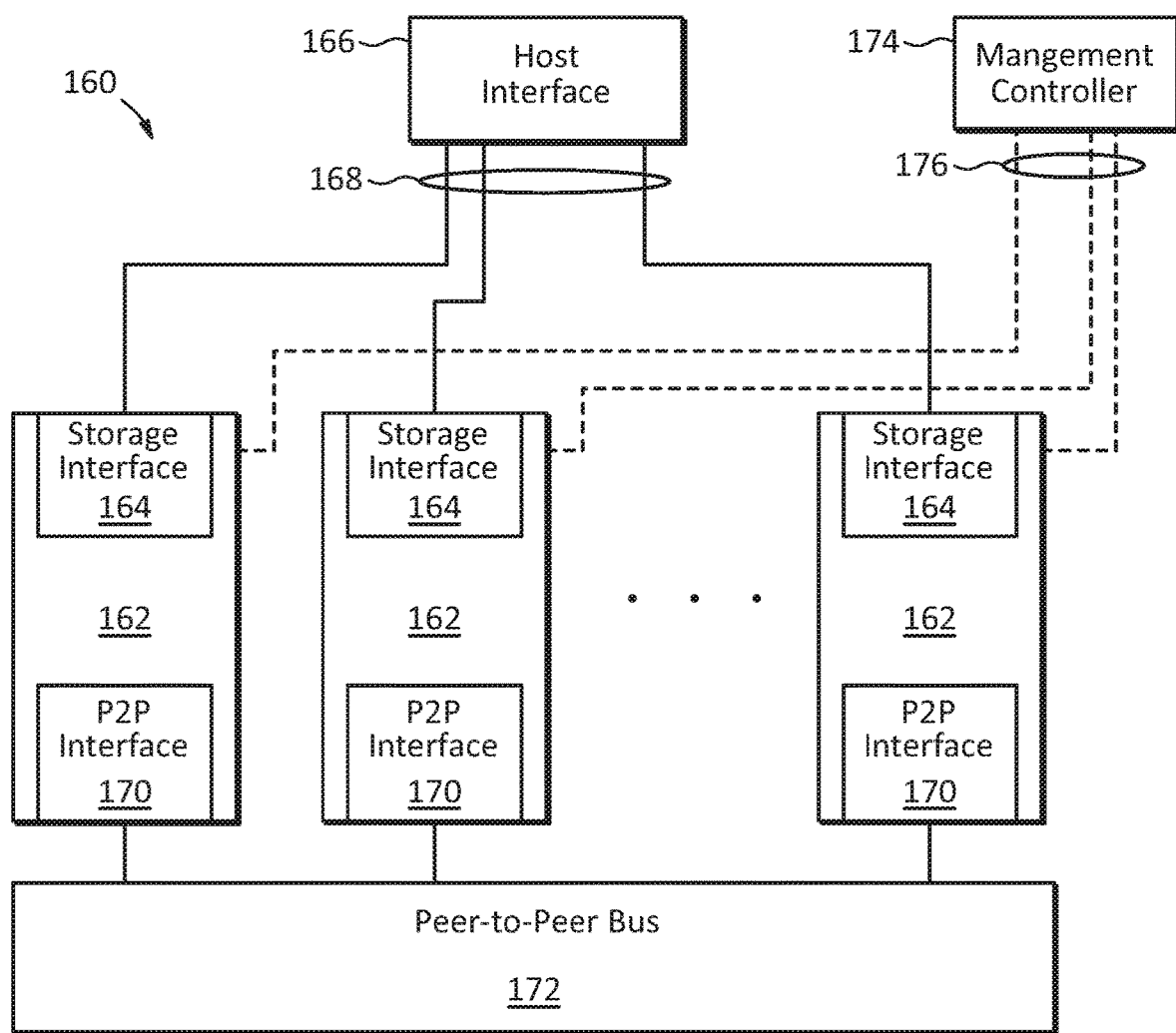
FIG. 3 illustrates an embodiment of a storage system that may include two or more storage devices that may have peer-to-peer data transfer capabilities according to this disclosure.

FIG. 3 illustrates an embodiment of a storage system that may include two or more storage devices that may have peer-to-peer data transfer capabilities according to this disclosure. The storage system 160 illustrated in FIG. 3 may include two or more storage devices 162 having storage interfaces 164 connected to a host interface 166 through one or more data connections 168. The storage devices 162 may also include peer-to-peer interfaces 170 connected to a peer-to-peer bus 172.

The peer-to-peer bus 172 may be used to implement one or more peer-to-peer channels between the storage devices 162. In some embodiments, the peer-to-peer bus 172 may refer to any or all of the hardware components, software components, communication protocols, and/or the like, that may be used to implement the one or more peer-to-peer channels. In some embodiments, any of the peer-to-peer channels may be implemented with wired, wireless, and/or other techniques, and/or combinations thereof.

Examples of wired techniques according to this disclosure may include one or more passive and/or active buses that may be coupled to storage devices through existing storage connectors and/or additional connectors. Bus conductors may be implemented on circuit boards, plates, ribbons, cables, wiring harnesses, and/or the like, and in some embodiments may be arranged for hot swapping, for example with one or more connectors and/or sliding contacts.

Examples of wireless techniques according to this disclosure may include radio frequency (RF) cellular interfaces such as 4G, 5G, etc., as well as any versions of Wi-Fi, Bluetooth, and/or the like. Examples of other techniques for implementing peer-to-peer channels according to this disclosure may include optical communications such as laser communications, with or without waveguides such as optical fibers.

The storage interfaces 164, host interface 166, and data connections 168 may be implemented using any storage interconnects, networks, protocols, connectors, and/or the like including SATA, SAS, NVMe, NVMe-oF, Peripheral Component Interconnect (PCI), PCIe, Fibre Channel, InfiniBand, TCP/IP, UDP/IP, RDMA, and/or the like, in any configuration, topology, and/or the like. The components of the storage system 160 may be arranged in any physical configuration using, for example, one or more midplanes, backplanes, switchboards, motherboards, connectors and/or the like. In some embodiments, the components may be contained in one or more open or closed enclosures such as a chassis, a rack, a group of racks, a data room, a datacenter building, and/or the like. In some embodiments, the storage system 160 may be housed in a storage chassis having any number of storage devices 162, for example, 24, 48, etc.

In some embodiments, the storage system 160 may further include a management controller 174 which may include, for example, a service processor such as a BMC configured to provide management and/or supervisory functions for the storage system 160. The management controller 174 may communicate with the storage devices through any communication interface 176 including SMBus, a PCIe fabric, Ethernet and/or the like. The management controller 174 may communicate with a user, a host, a datacenter manager, and/or the like through any communication path including, for example, a dedicated network connection, a link to the host interface 166, and/or the like.

In some embodiments, the host interface 166 may be connected to one or more local and/or remote hosts. For example, in some embodiments, the host interface 166 may be connected to a local host that may implement one or more storage control functions such as RAID, erasure coding (EC), and/or the like. In some other embodiments, the host interface 166 may be implemented, for example, as a network switch or gateway to a remote host.

In some embodiments, one or more remote hosts, one or more of the storage devices 162, and/or the management controller 174 may include logic to implement topology and/or feature discovery, connection establishment, messaging flow control, QoS configuration and/or other features to enable the storage devices 162 to perform various functions such as RAS functions, computational storage operations, and/or the like, using peer-to-peer channels.

For example, in some embodiments, topology discovery may be initiated and/or conducted in a centralized manner by a host, a service processor such as a BMC, and/or the like. Alternatively, or additionally, or one or more storage devices may self-discover, and/or establish connections with, one or more other peer-to-peer capable devices in a distributed manner. As another example, storage devices may be arranged into peer-to-peer groups and/or subgroups, with various topologies and with various resources such as bandwidth, priority, and/or the like distributed therebetween. Such configuration may be performed statically and/or dynamically by a host, a service processor such as a BMC, a service processor, and/or the like based on any number of policy parameters.

In some embodiments according to this disclosure, peer-to-peer data transfers between storage devices may be used to implement data reliability techniques using data redundancy to recover lost data using redundant data. For example, prior to a data loss, two or more storage devices may exchange replication copies of data for back-up purposes, and after a loss may exchange data for recovery purposes, with little or no intervention by a host. As another example, one or more storage devices may implement data striping across multiple devices.

In some embodiments, one or more storage devices may use peer-to-peer data transfers to implement computational storage and/or otherwise offload computation and/or bandwidth loads from one or more hosts and/or host interfaces. For example, in some embodiments, one or more storage devices in a group or subgroup of devices having a peer-to-peer channel configured between them may be designated to perform data compression, encryption, and/or the like for the other storage devices in the group, subgroup, storage system, and/or the like. As another example, in some embodiments, one or more storage devices may use peer-to-peer channels to transfer intermediate calculation results between devices for further calculations without having to send and/or receive the intermediate results to and/or from a host.

Figure 4:
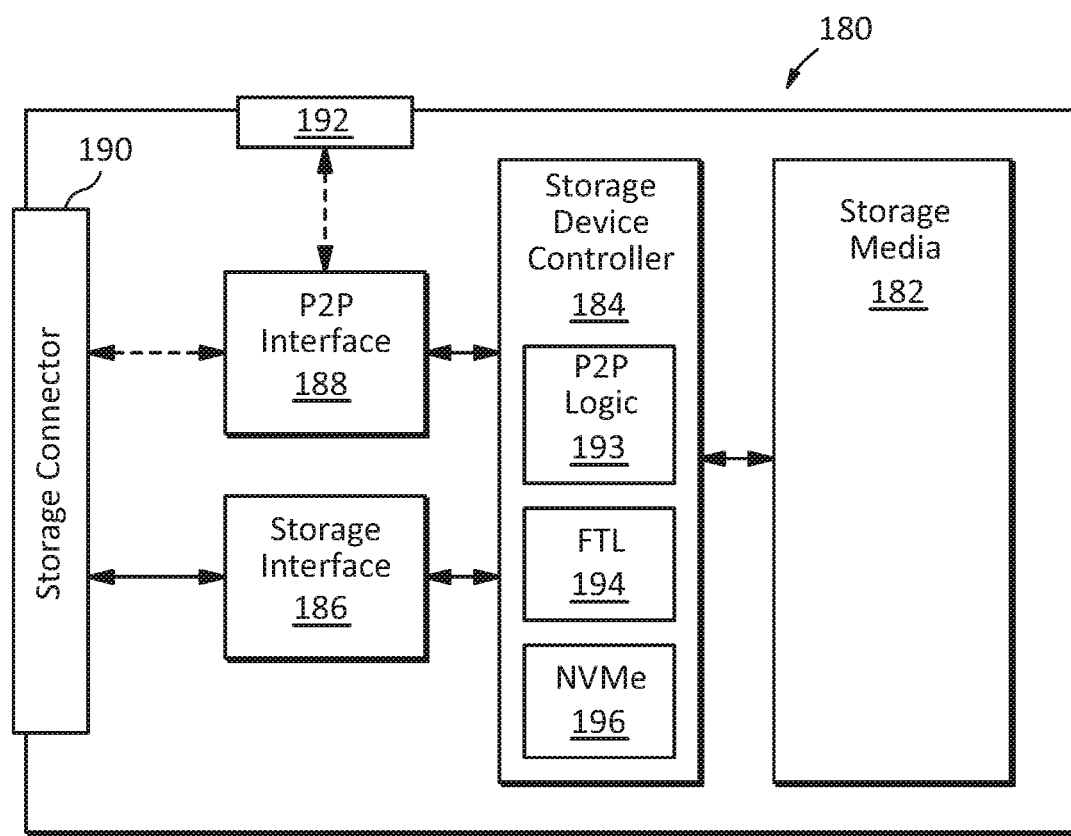
FIG. 4 illustrates an embodiment of a storage device that may have peer-to-peer data transfer capabilities according to this disclosure.

FIG. 4 illustrates an embodiment of a storage device that may have peer-to-peer data transfer capabilities according to this disclosure. The storage device 180 illustrated in FIG. 4 may be used, for example, as one of the storage devices 162 illustrated in FIG. 3. The storage device 180 may include a storage media 182, a storage device controller 184, a storage interface 186, a peer-to-peer interface 188, and a storage connector 190. The storage device controller 184 may be configured to control data transfers to the storage media 182 and the interfaces 186 and 188. The storage device controller 184 may include peer-to-peer logic 193, for example, for implementing any of the peer-to-peer features disclosed herein including topology and/or feature discovery, connection establishment, messaging flow control, QoS configuration, RAS functions, computational storage operations, and/or the like. In embodiments in which the storage device 180 is implemented as an SSD, the storage device controller 184 may also include a flash translation layer (FTL) 194 and/or an NVMe manager 196.

In some embodiments, the storage interface 186 may be implemented with any interface, protocol, and/or the like including SATA, SAS, NVMe, NVME-oF, PCI, PCIe, Fibre Channel, InfiniBand, TCP/IP, UDP/IP, RDMA, and/or the like. The storage connector 190 may be implemented with any suitable connector such as, for example, a U.2 connector which may be able to accommodate different families of storage protocols such as SATA, SAS and NVMe, and/or variants and/or combinations thereof.

In some embodiments, the peer-to-peer interface 188 may be implemented with any communication interface for establishing one or more peer-to-peer channels including wired, wireless, and/or other techniques, and/or combinations thereof. In some embodiments, the peer-to-peer interface 188 may be connected through the storage connector 190, for example, using one or more reserved, reassigned and/or new terminals (pins) on an existing connector design. In some embodiments, a new storage connector 190 may be design to accommodate terminals for the storage interface 186 and the peer-to-peer interface 188. In some embodiments, the peer-to-peer interface 188 may be accessed through an additional connector 192 instead of, or in addition to, the storage connector 190. In some embodiments, for example, where the peer-to-peer interface 188 may be implemented with a wireless technique, the peer-to-peer interface 188 may not use an additional connector 192, or connection through the storage connector 190.

In some embodiments, the storage interface 186 and the peer-to-peer interface 188 may be integral with each other. For example, in some embodiments, the storage device 180 may include a dual-port Ethernet interface in which the storage interface 186 may use one of the ports, and the peer-to-peer interface 188 may use the other port. In some embodiments, the peer-to-peer interface 188 may be implemented, at least partially, as a virtual interface. In some embodiments, the storage interface 186 and the peer-to-peer interface 188 may essentially be implemented with the same communication interface, wherein the peer-to-peer channel may be realized as a virtual channel through a switch fabric used to connect the storage interface 186 to one or more other storage devices and/or one or more local and/or remote hosts. Thus, in some embodiments, a peer-to-peer bus may be integral with a switch fabric (such as a network or interconnect fabric) used for a main data path between one or more storage devices and one or more hosts.

Any or all of the storage device controller 184, storage interface 186, and peer-to-peer interface 188 may be implemented in hardware, software or any combination thereof.

Some example embodiments of systems, processes, methods, and/or the like illustrating some possible implementation details according to this disclosure are described below. These examples are provided for purposes of illustrating the principles of this disclosure, but the principles are not limited to these embodiments, implementation details, and/or the like.

Figure 5:
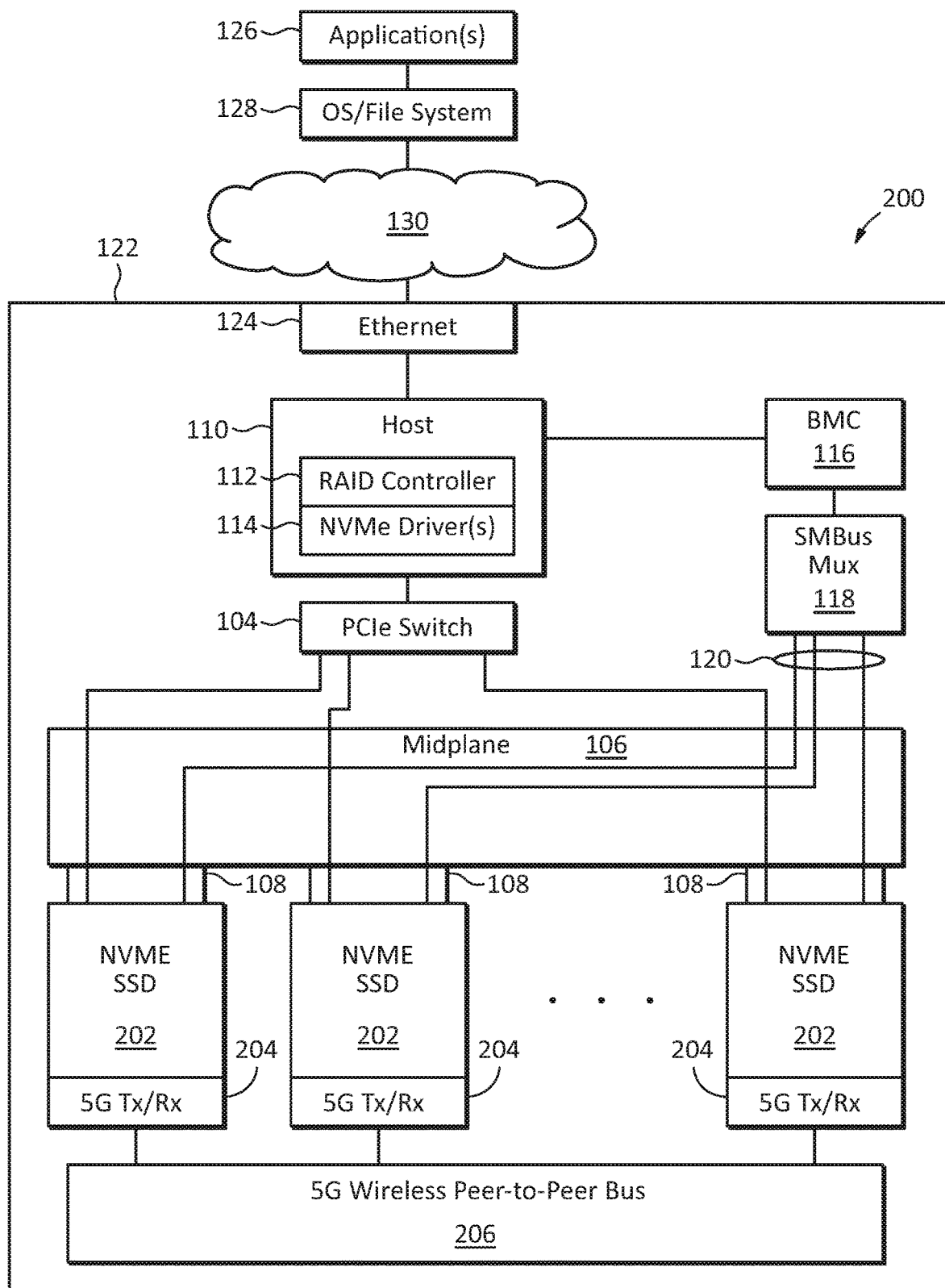
FIG. 5 illustrates an example embodiment of a storage system having storage devices with peer-to-peer data transfer capabilities implemented with wireless techniques according to this disclosure.

FIG. 5 illustrates an example embodiment of a storage system having storage devices with peer-to-peer data transfer capabilities implemented with wireless techniques according to this disclosure. The system 200 illustrated in FIG. 5 may include some components arranged in a DAS architecture similar to the embodiment illustrated in FIG. 1, but storage devices 202 may include peer-to-peer interfaces 204 implemented with wireless modules such as 5G cellular transmit and receive (Tx/Rx) modules as shown in FIG. 5. Thus, the system 200 may implement a wireless peer-to-peer bus 206 which may have any number of features similar to the peer-to-peer bus 172 illustrated in FIG. 3.

In some embodiments, one or more of the 5G wireless modules 204 may be tuned and/or optimized based on the implementation details of the storage system 200. For example, if the system is housed in a server chassis, the wireless modules 204 may be tuned for high bandwidth at low-power and/or low latency due to the proximity of the modules in the chassis. As another example, if the storage drives 202 are more widely distributed spatially, for example throughout a server rack, data room, datacenter, and/or the like, the wireless modules may be tuned to make a tradeoff, for example, trading bandwidth to operate at the same relatively low power, or operating at increased power to maintain bandwidth at longer distances.

Although the system 200 is illustrated in the context of some specific implementation details such as a DAS architecture with NVMe drives, 5G wireless techniques, a midplane, an SMBus management interface, and/or the like, other embodiments using any cellular wireless modules may be realized with any other implementation details according to this disclosure.

Figure 6:
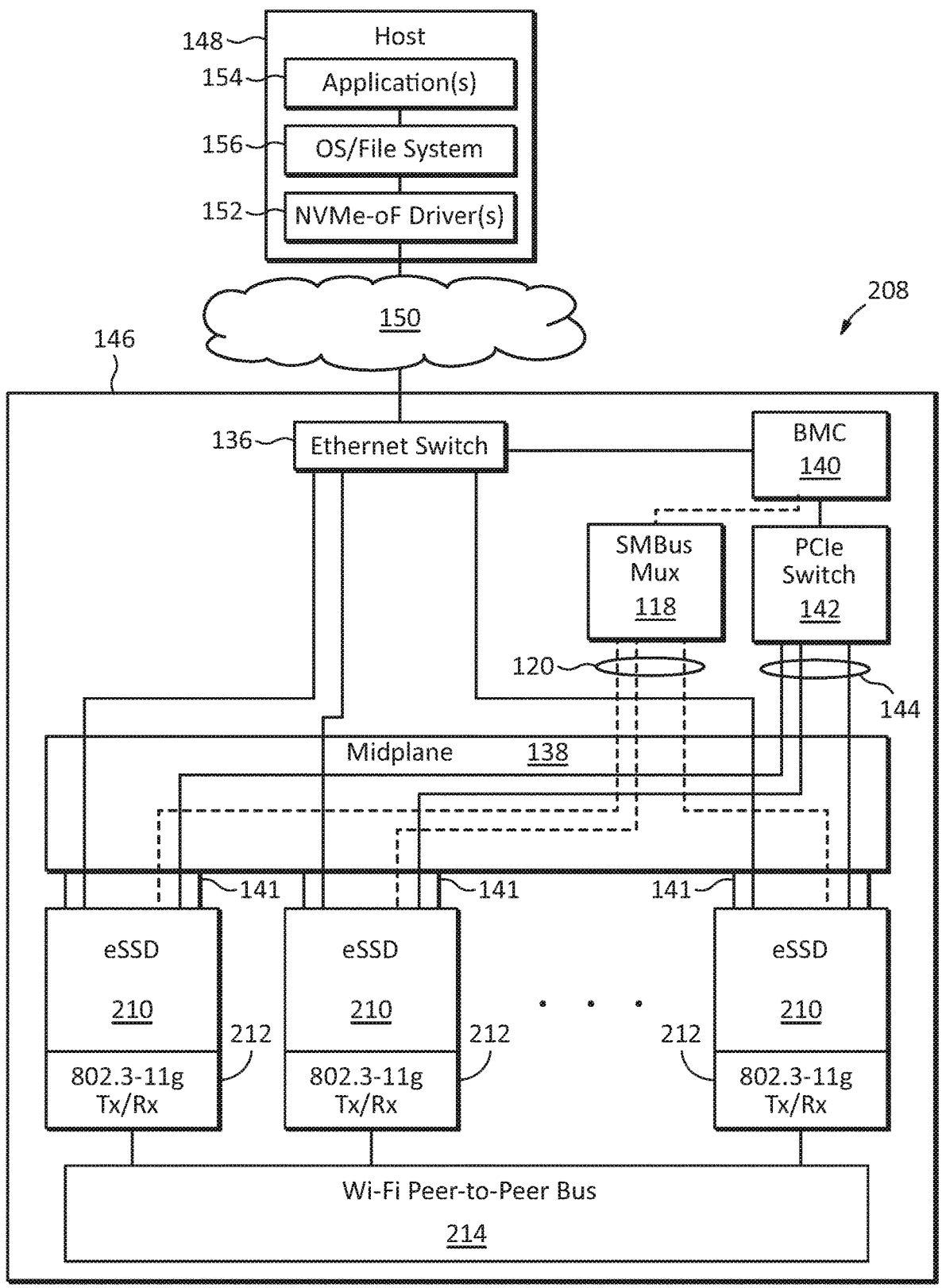
FIG. 6 illustrates another example embodiment of a storage system having storage devices with peer-to-peer data transfer capabilities implemented with wireless techniques according to this disclosure.

FIG. 6 illustrates another example embodiment of a storage system having storage devices with peer-to-peer data transfer capabilities implemented with wireless techniques according to this disclosure. The system 208 illustrated in FIG. 6 may include some components arranged in an rDAS architecture similar to the embodiment illustrated in FIG. 2, but storage devices 210 may include peer-to-peer interfaces 212 implemented with Wi-Fi modules such as Institute of Electrical and Electronics Engineers (IEEE) standard IEEE 802.3.11g modules as shown in FIG. 6. Thus, the system 208 may implement a wireless peer-to-peer bus 214 which may have any number of features similar to the peer-to-peer bus 172 illustrated in FIG. 3.

In some embodiments, one or more of the Wi-Fi modules 212 may be tuned and/or optimized based on the implementation details of the storage system 208 in a manner similar to that described above with respect to the system 200 illustrated in FIG. 5. Although the system 208 is illustrated in the context of some example implementation details such as an rDAS architecture with eSSD drives, Wi-Fi wireless techniques, a midplane, a PCIe-based management interface, and/or the like, other embodiments using any Wi-Fi wireless modules may be realized with any other implementation details according to this disclosure.

Figure 7:
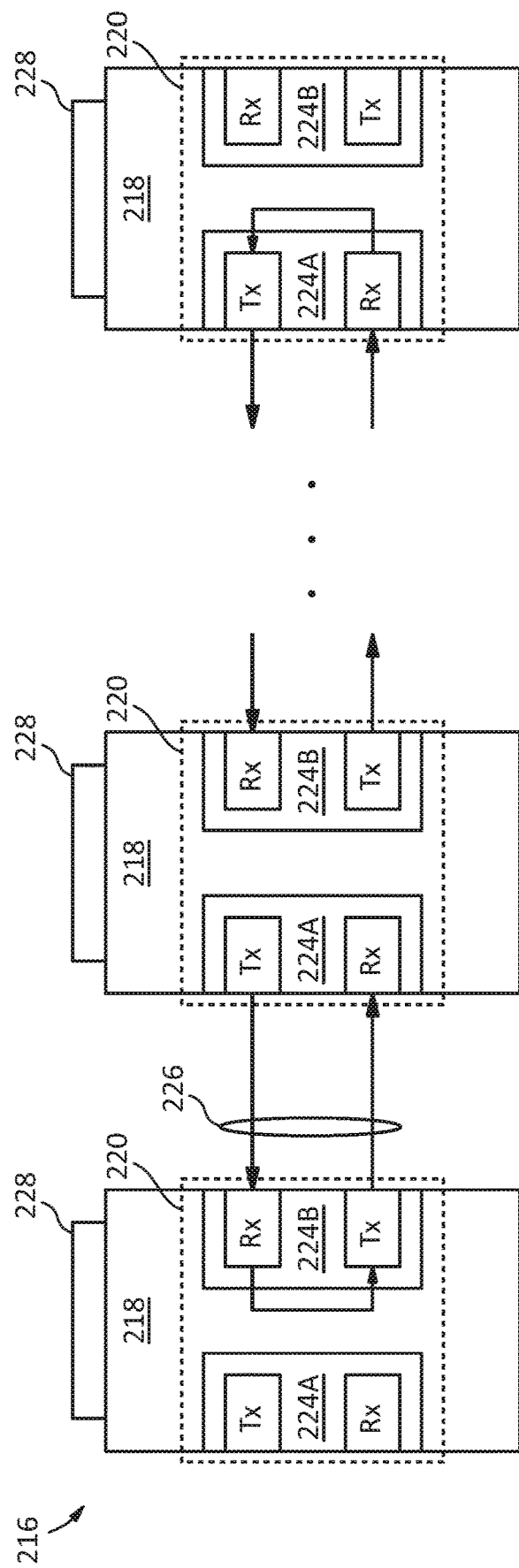
FIG. 7 illustrates an example embodiment of a storage system having storage devices with peer-to-peer data transfer capabilities implemented with optical communication techniques according to this disclosure.

FIG. 7 illustrates an example embodiment of a storage system having storage devices with peer-to-peer data transfer capabilities implemented with optical communication techniques according to this disclosure. The system 216 illustrated in FIG. 7 may include storage devices 218 having peer-to-peer interfaces implemented with laser communication modules 220. In some embodiments, one or more of the modules may have two ports 224A and 224B. The storage devices 218 and/or modules 220 may be arranged such that a port 224A on one module 220 may be aligned with, and transfer data to and from, a corresponding module 224B on an adjacent module 220, for example on a device in an adjacent chassis slot, thus forming a link 226 using laser beam encoding to exchange messages. One or more ports 224A and/or 224B may have a laser transmitter (Tx) and receiver (Rx). Thus, the modules 220 may form a peer-to-peer bus in a loop or chain topology which may have any number of features similar to the peer-to-peer bus 172 illustrated in FIG. 3. In some embodiments, one or more of the ports 224A and/or 224B may be capable of loopback operation thereby enabling the modules at either end of a chain to loopback messages not addressed to them, thereby forming a ring topology.

In some embodiments, one or more of the storage devices 218 may include a storage connector 228 such as a U.2 connector to connect a storage interface in the storage device to a host interface for host traffic. Although the system 216 may be illustrated in the context of some example implementation details such as dual-port laser modules 220 and a ring or chain topology, other embodiments using laser or other optical communications may be realized with any other implementation details according this disclosure.

Figure 8:
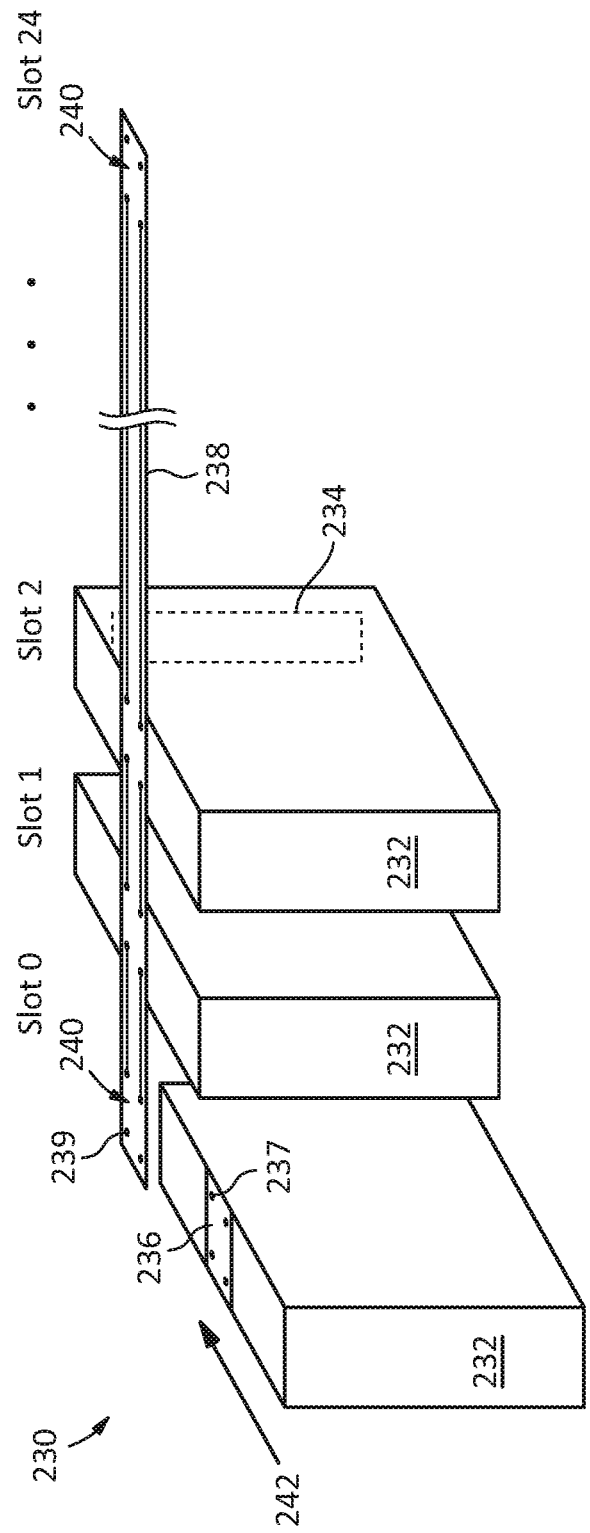
FIG. 8 illustrates an example embodiment of a mechanical configuration for a storage system having storage devices with peer-to-peer data transfer capabilities implemented with wired techniques according to this disclosure.

FIG. 8 illustrates an example embodiment of a mechanical configuration for a storage system having storage devices with peer-to-peer data transfer capabilities implemented with wired techniques according to this disclosure. The system illustrated in FIG. 8 may include storage devices 232 having a storage connector such as a U.2 connector 234 (shown in phantom outline on the back side of a storage device 232) and an additional connector 236. The storage connector 234 may plug into a corresponding socket on a midplane or other structure when the storage device 232 is inserted into a slot as shown by arrow 242 to establish a connection between a storage interface in the storage device 232 and a host. A wired bus apparatus 238 such as a top plate or ribbon cable may have connectors 240 that may align with the additional connector 236 on a corresponding storage device 232. The additional connector 236 on storage device 232 may connect a peer-to-peer interface in the storage device 232 to electrical traces on the bus apparatus 238, thereby forming a peer-to-peer wired bus between the storage devices 232.

In some embodiments, one or more sliding contacts and/or spring loaded pins 237 on an additional connector 236 may engage with one or more corresponding contact pads 239 on a corresponding connector 240 on the bus apparatus 238, thereby establishing one or more electrical connections between the additional connector 236 and the bus apparatus 238. In some embodiments, the locations of one or more of the sliding and/or spring loaded contacts and pads may be reversed. In some embodiments, the wired bus apparatus 238 may be arranged, for example, across any or all of the slots in a chassis or other storage enclosure on the top side of one or more bays for the storage devices 232, which may have additional connectors 236 arranged along a top edge of the device.

Figure 9:
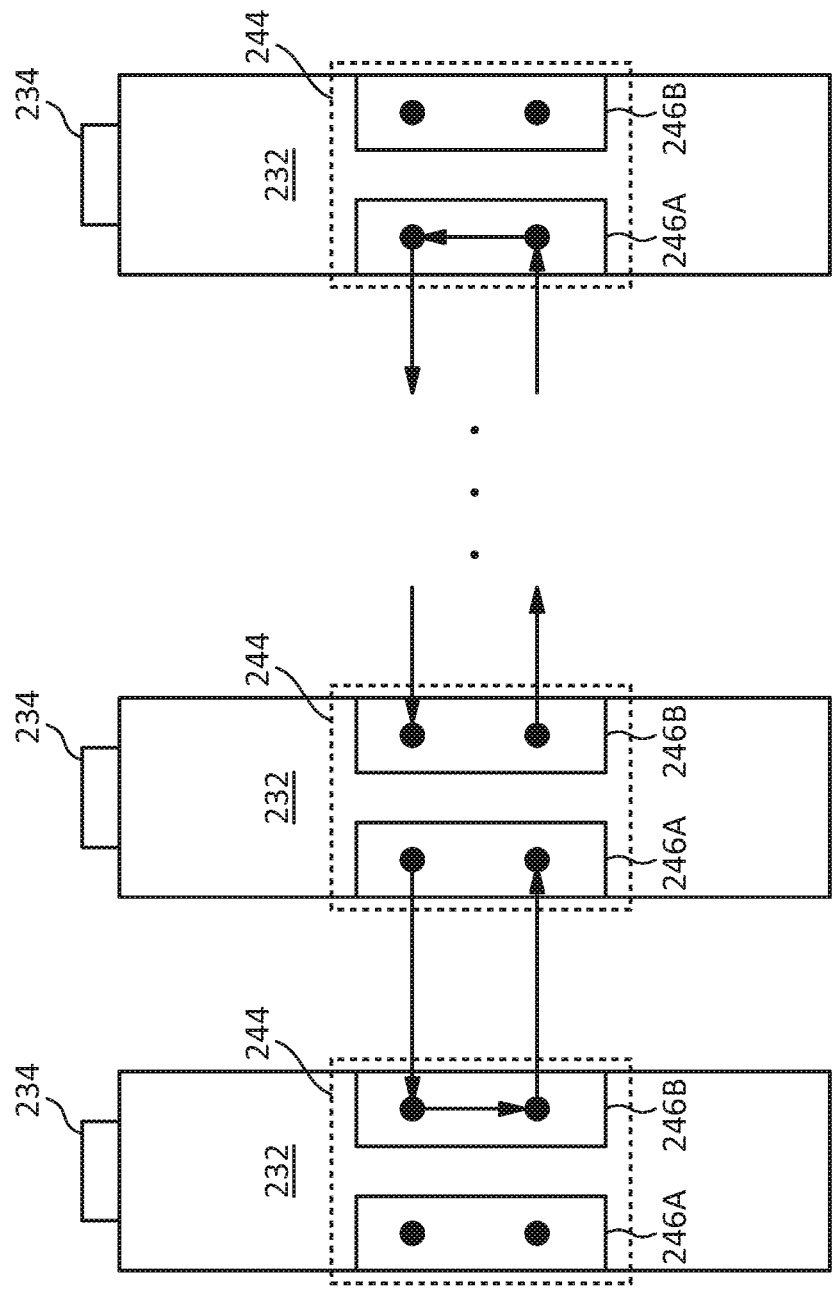
FIG. 9 illustrates an example embodiment of an electrical configuration for a wired peer-to-peer bus for a storage system according to this disclosure.

FIG. 9 illustrates an example embodiment of an electrical configuration for a wired peer-to-peer bus for a storage system according to this disclosure. The electrical configuration illustrated in FIG. 9 may be used, for example, with the mechanical configuration and/or bus apparatus 238 illustrated in FIG. 8. In the storage system 230 illustrated in FIG. 9, storage devices 232 may include peer-to-peer interfaces 244 having dual ports 246A and 246B. The arrows may illustrate signal flow through electrical traces on a wired bus apparatus 238 when storage devices 232 are plugged into slots in a storage system. In some embodiments, one or more of the ports 246A and/or 246B may be capable of loopback operation thereby enabling the interfaces at either end of a chain to loopback messages not addressed to them, thereby forming a ring topology.

In some embodiments, an electrical and/or mechanical arrangement as illustrated in FIGS. 8 and 9 may enable hot swapping of storage devices 232 in a storage system 230.

Figure 10:
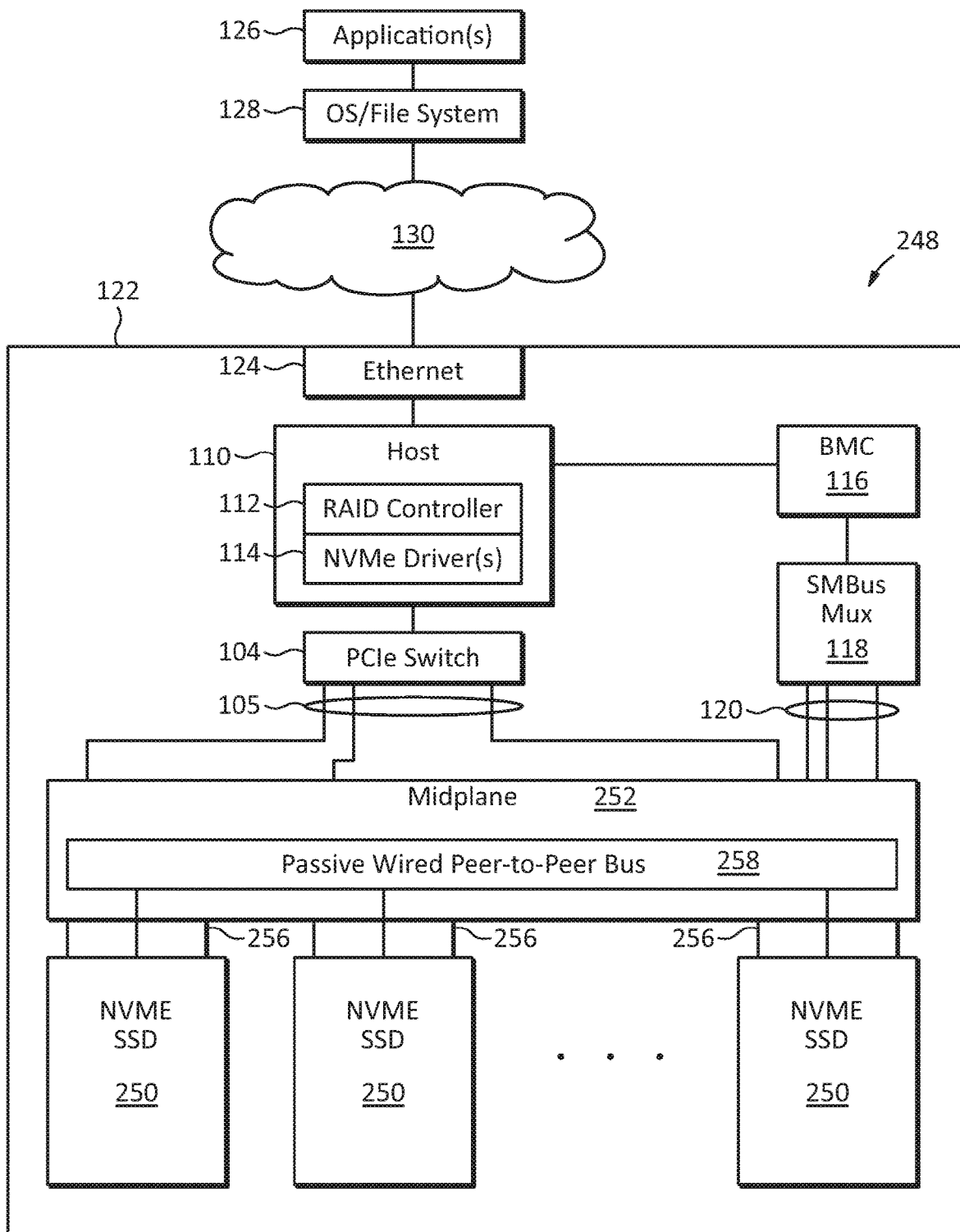
FIG. 10 illustrates an example embodiment of a storage system having storage devices with peer-to-peer data transfer capabilities implemented with a passive wired bus connected through an existing connector according to this disclosure.

FIG. 10 illustrates an example embodiment of a storage system having storage devices with peer-to-peer data transfer capabilities implemented with a passive wired bus connected through an existing connector according to this disclosure. The system 248 illustrated in FIG. 10 may include some components arranged in a DAS architecture similar to the embodiment illustrated in FIG. 1, but storage devices 250 may include peer-to-peer interfaces that may use one or more unused, undefined and/or redefined terminals or pins in an existing connector such as a U.2 storage connector 256 as illustrated in FIG. 10. To avoid obscuring the drawing, the routing of the PCIe connections 105 and management bus connections 120 are not shown on the Midplane 252. In some embodiments, electrical traces on the midplane 252 may be routed to form a passive peer-to-peer bus 258 on the midplane. The bus 258 may be configured with any number and/or configuration of peer-to-peer channels between storage devices 250 and/or groups and/or subgroups of storage devices. For example, in some embodiments, channels may be routed between neighboring storage devices 250 to form a chain and/or loop topology. In some embodiments, any other channel topologies may be used including star topologies, multi-drop buses, and/or any combinations thereof.

Although the system 248 is illustrated in the context of some specific implementation details such as a DAS architecture with NVMe drives, U.2 connectors and a peer-to-peer bus on the midplane, in other embodiments, any other architectures, storage device types, connectors and/or the like may be used. For example, in some embodiments, connections between a peer-to-peer bus and a storage device may be made through a connector other than a U.2 connector, for example a connector for an SMBus interface, or a new connector design that may be used to create new terminals (pins) for the peer-to-peer data channels. As another example, in some embodiments, a passive peer-to-peer bus may be implemented on backplane, a switchboard, a motherboard, and/or any other apparatus in a storage system.

Figure 11:
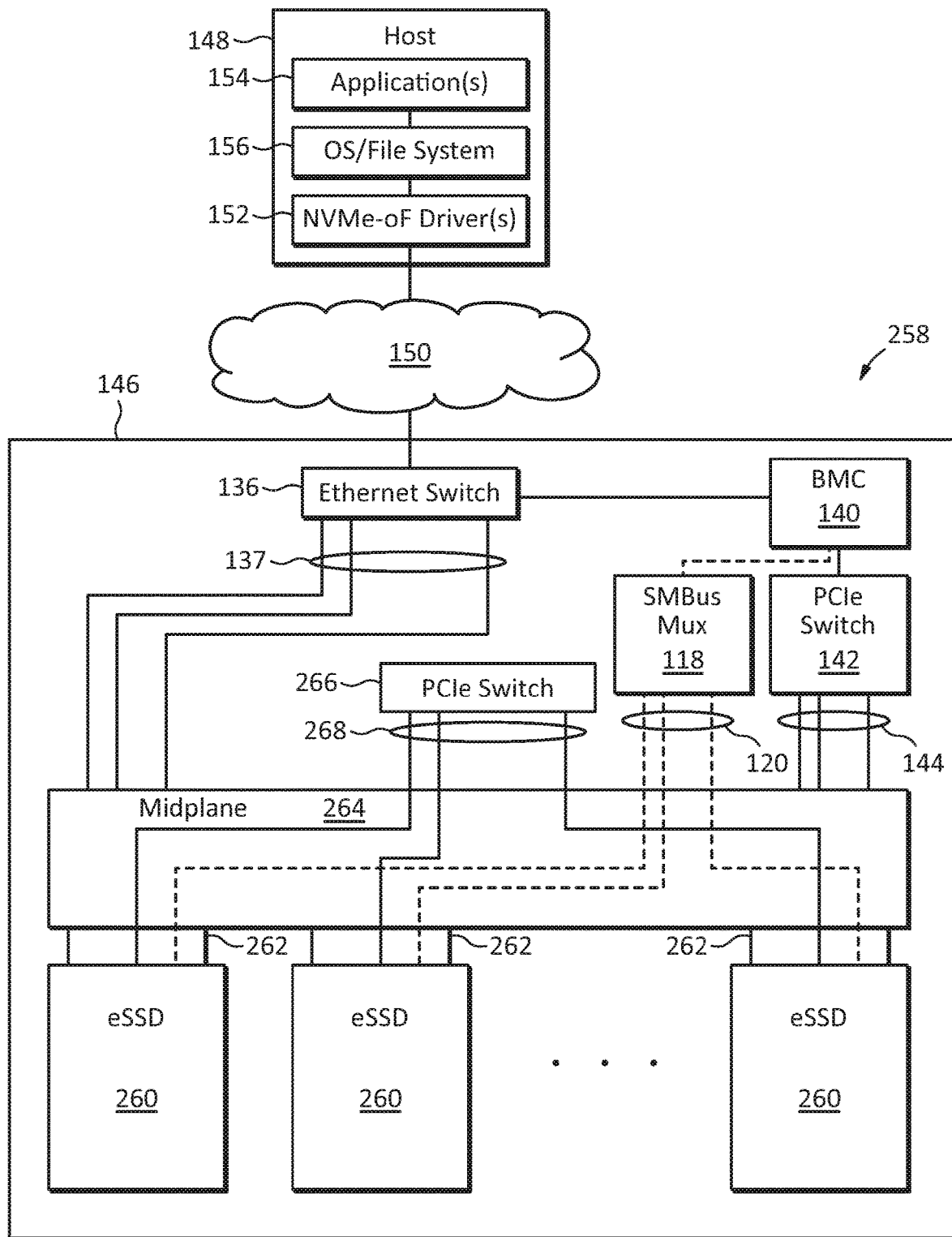
FIG. 11 illustrates an example embodiment of a storage system having storage devices with peer-to-peer data transfer capabilities implemented with an active wired bus connected through an existing connector according to this disclosure.

FIG. 11 illustrates an example embodiment of a storage system having storage devices with peer-to-peer data transfer capabilities implemented with an active wired bus connected through an existing connector according to this disclosure. The system 258 illustrated in FIG. 11 may include some components arranged in an rDAS architecture similar to the embodiment illustrated in FIG. 2, but storage devices 260 may include peer-to-peer interfaces that may use one or more unused, undefined and/or redefined terminals or pins in an existing connector such as a U.2 storage connector 262 as illustrated in FIG. 11. To avoid obscuring the drawing, the routing of the Ethernet connections 137 and management bus connections 144 are not shown on the Midplane 264. In some embodiments, the peer-to-peer interface connections at the connectors 262 may be connected to a switch fabric to form an active peer-to-peer bus between the storage devices 260. In the example illustrated in FIG. 11, the switch fabric may be implemented as a PCIe switch 266 which may be located, for example, on a switchboard in the enclosure 146. PCIe links 268 between the PCIe switch 266 and the storage devices 260 may be routed through the midplane 264. The active peer-to-peer bus implemented with the PCIe switch 266 may be configured with any number and/or configuration of peer-to-peer channels between storage devices 260 and/or groups and/or subgroups of storage devices.

Although the system 258 is illustrated in the context of some specific implementation details such as an rDAS architecture with eSSD drives, U.2 connectors and a switch fabric implemented with a PCIe switch, in other embodiments, any other architectures, storage device types, connectors and/or the like may be used. For example, in some embodiments, other types of switch fabric may be used to implement the peer-to-peer bus including SATA, SAS, NVMe, NVME-oF, PCI Fibre Channel, InfiniBand, TCP/IP, UDP/IP, RDMA, and/or the like. As another example, in some embodiments, a switch may be located on a midplane, a backplane, a motherboard, and/or any other apparatus in a storage system, and connections from the storage devices 260 and switch fabric may be routed through any suitable apparatus.

In some embodiments, a management controller, and/or one or more storage devices having peer-to-peer data transfer capabilities may participate in a topology discovery process which may involve discovering the presence of one or more peer-to-peer capable storage devices and/or configuring one or more peer-to-peer channels between the storage devices. In some embodiments, a host and/or a management controller, which may include a service processor such as a BMC, may initiate and/or manage a topology discovery process. In some embodiments, a slot or connector number in which a storage device is located may serve as an identifier for the storage device. A discovery process may depend on one or more techniques used to implement a peer-to-peer bus according to this disclosure. For example, in embodiments with wireless peer-to-peer channels, various topologies may be formed under the control of a host, BMC, and/or storage and/or datacenter administrator such as 1:1, 1:N, N:N, and/or combinations thereof. In some embodiments, such as with optical (e.g., laser) and/or chained hardwire topologies, a peer-to-peer channel may have an inherent 1:1 ring or chain topology, although such topologies may still be varied and/or combined to create more complex topologies.

In some embodiments, in the absence of a topology determined by a host or a service processor such as a BMC, one or more storage devices may self-discover other peer-to-peer capable storage devices and establish connections. In some embodiments, a storage device may contain one or more default parameters with regard to peer-to-peer connection establishment process. In some embodiments, after a storage system powers up, one or more storage devices in the system may broadcast their identifiers over a peer-to-peer bus. One or more other peer-to-peer storage devices may record these broadcast identifiers and/or use the broadcast identifiers to form various topologies, for example, 1:1 in slot ascending or descending order, 1:N, N:N, and/or combinations thereof. Moreover, a topology and/or one or more groups and/or subgroups may be created dynamically through a host, a management controller, and/or one or more storage devices.

In some embodiments, one or more QoS parameters may be established for peer-to-peer data transfers between one or more storage devices, groups and/or subgroups of storage devices, and/or the like. QoS parameters may be established by one or more hosts, management controllers, storage devices, and/or the like. For example, in a storage system having a designated storage device that may perform a service like compression, encryption, and/or the like for other devices, the designated device may have a default peer-to-peer bandwidth configuration for the service (i.e., device-based QoS configuration), which may be overridden by a host which may set a different bandwidth for purposes of the service (i.e., host-based QoS configuration).

QoS parameters may include priority, resources, bandwidth, latency and/or other performance settings. In some embodiments, different QoS parameters may be applied to different groups or subgroups of storage devices. For example, within a chassis or rack of storage devices, a first group of storage devices may belong to an erasure coding (EC) domain which involve more deterministic communications, and therefore, the first group may have higher and/or guaranteed QoS parameters such as bandwidth, latency, and/or the like. In contrast, a second group of storage devices may calculate checksums and/or perform other background data verification tasks which may not involve real-time requirements, and therefore the second group may have lower QoS parameters. In some embodiments, one or more groups and/or subgroups may have one or more QoS parameters that may be tuned or optimized for peer-to-peer communications compared to host traffic.

In some embodiments, one or more QoS parameters for one or more storage devices, groups and/or subgroups of storage devices, and/or the like may be based on one or more policy parameters. Examples of policy parameters may include application type, application identifier, Namespace identifier, host identifier, logical block address (LBA) address ranges, non-volatile memory (NVM) set identifier, NVMe submission queue identifier, completion queue identifier, Stream Identifier, Ethernet MAC Identifier, TCP/IP addresses and other transport/network parameters, and general parameters like number of storage devices in a chassis, rack, etc., date, time, and/or the like.

In some embodiments, flow control and/or other reliability techniques may be implemented in one or more peer-to-peer channels between storage devices according to this disclosure. For example, an acknowledge/no-acknowledge (Ack/Nack) opcode may be used in messages between devices. An Ack/Nack opcode may be useful, for example, after a peer-to-peer channel is established between a group of storage devices. If multiple devices within the group attempt to transmit data to a single destination device, the destination device may only accept a portion of the transmitted data depending on resources such as buffer memory that may be available to the destination device. The use of an Ack/Nack opcode may enable the devices to determine which portions of the transmitted data was accepted, and which, if any, devices may need to re-transmit data. As a further example, a message length and/or message sequence number may be used in a completion entry. For example, in some embodiments, when a source device sends data to a destination device, the destination device may acknowledge receipt of the data by placing a message length in a completion entry. As a further example, in some embodiments, a message may contain sequence numbers such that, when a message reaches a destination device, the destination device may determine if there are any missing messages that may be re-transmitted.

Figure 12:
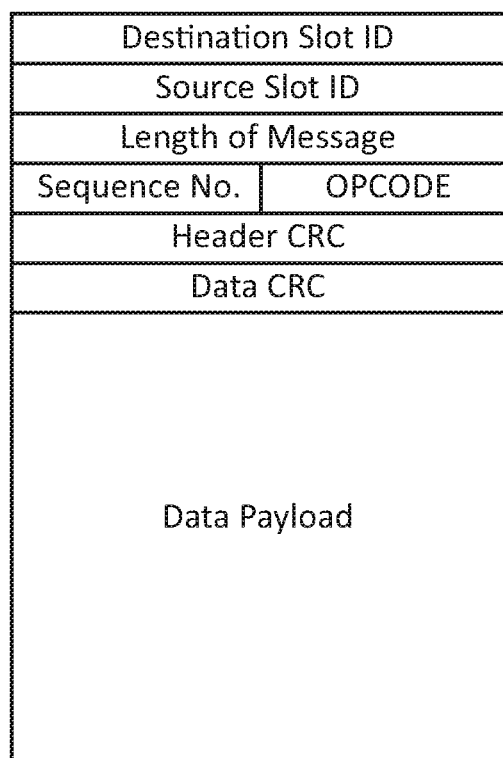
FIG. 12 illustrates an example embodiment of a message format according to this disclosure.

In some embodiments, peer-to-peer data may be transferred between storage devices using data messages. FIG. 12 illustrates an example embodiment of a message format according to this disclosure. The embodiment illustrated in FIG. 12 may include a header portion and a data portion. The header may contain identifiers for a sending device and a receiving device. In some embodiments, sending and/or receiving devices may be identified by a slot ID in a rack or other enclosure. In some embodiments, the header may also contain additional fields such as length of the message, message sequence number, an Ack/Nack opcode, data protection fields such cyclical redundancy check (CRC) codes for the header and/or data payload, and/or the like.

In some embodiments, one or more storage devices, peer-to-peer data transfer capabilities according to this disclosure may be implemented as an optional feature such that the device may be configured for default behavior as a standard storage device if installed in a system or with other storage devices without peer-to-peer data transfer capabilities. For example, a peer-to-peer interface may not affect normal data traffic between the storage device and a host, as well as normal host command arbitration, execution, completion, and/or the like. Thus, devices having peer-to-peer data transfer capabilities according to this disclosure may coexist with other storage devices. For example, in some embodiments, peer-to-peer data transfer capabilities may be enabled and/or disabled under control of a host and/or management controller.

Figure 13:
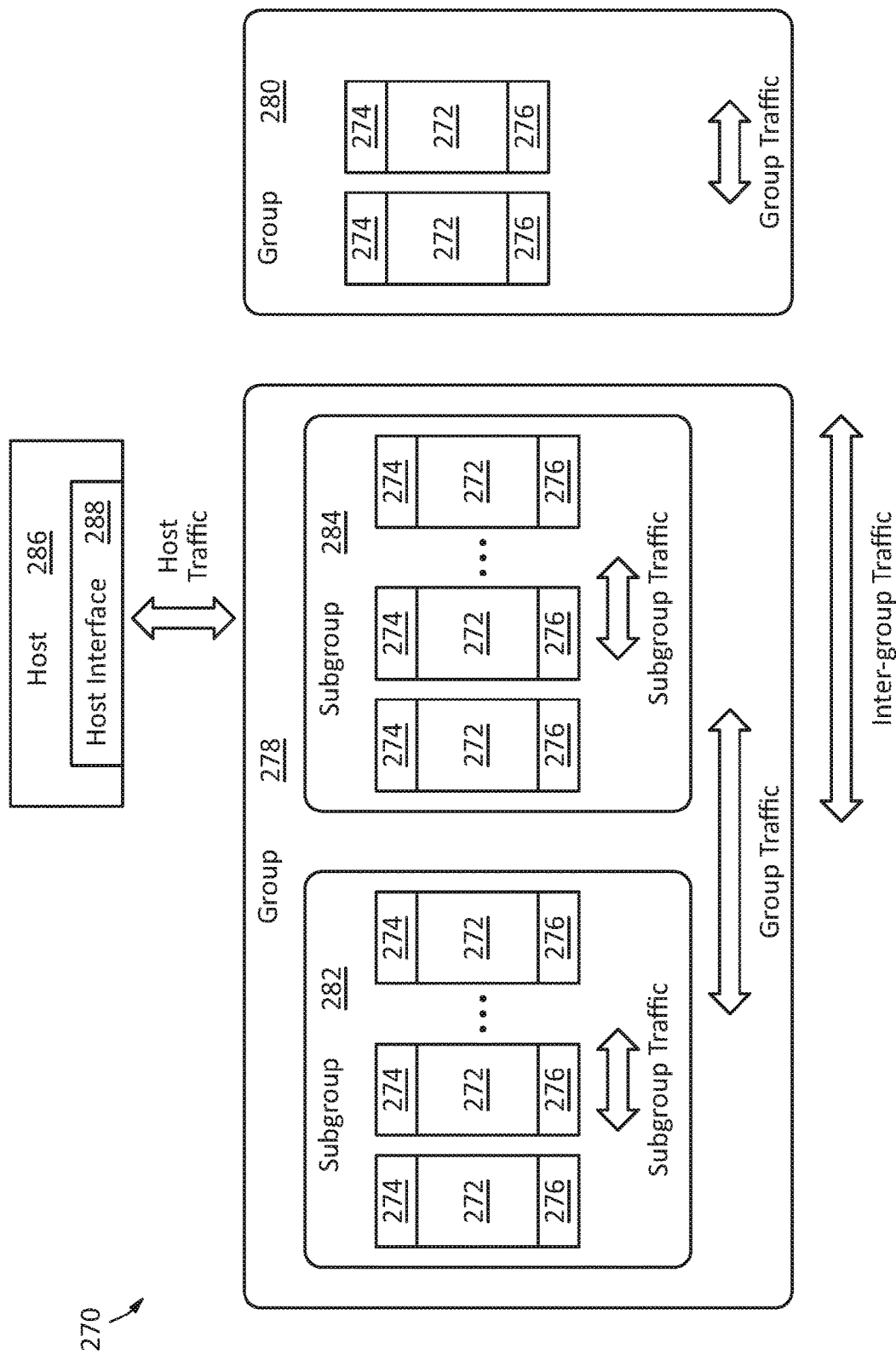
FIG. 13 illustrates a data flow diagram for an embodiment of a method for operating a storage system in which storage devices may exchange data through one or more peer-to-peer channels according to this disclosure.

FIG. 13 illustrates a data flow diagram for an embodiment of a method for operating a storage system in which storage devices may exchange data through one or more peer-to-peer channels according to this disclosure. The method 270 illustrated in FIG. 13 may be implemented, for example, using any of the storage system described herein. In the method 270 illustrated in FIG. 13, storage devices 272 having storage interfaces 274 and peer-to-peer interfaces 276. The storage devices 272 may be divided into a first group of storage devices 278 and a second group of storage devices 280. The first group 278 may be further divided into a first subgroup 282 and a second subgroup 284. Peer-to-peer traffic may flow between storage devices within each group and/or subgroup as shown by the arrows in FIG. 13. A host 286 may have a host interface 288 which may be connected to the storage interfaces 274 on the storage devices 272 to enable host traffic to flow between the host and storage devices.

Figure 14:
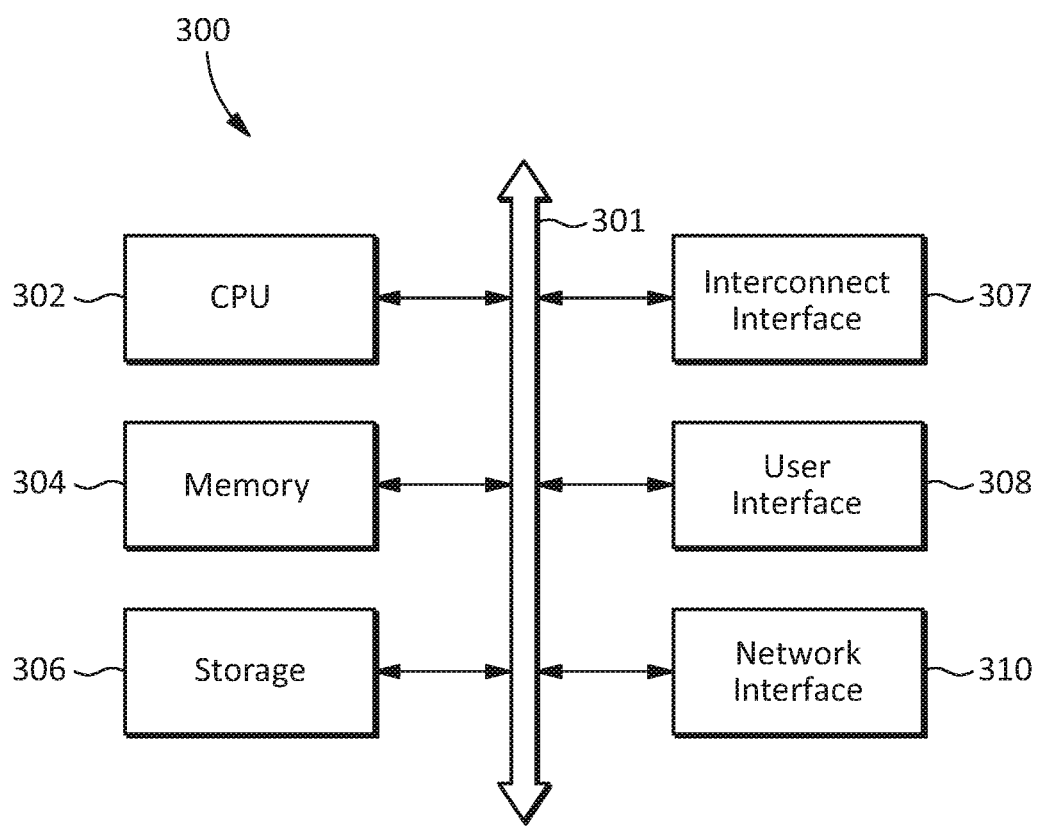
FIG. 14 illustrates an embodiment of a computing system according to this disclosure.

FIG. 14 illustrates an embodiment of a computing system according to this disclosure. The system 300 of FIG. 14 may be used, for example, to implement any or all of the methods and/or apparatus described in this disclosure. For example, the system 300 may be used to implement a host, a service processor such as a BMC, a storage device controller in a storage device, and/or the like. The system 300 may include a central processing unit (CPU) 302, memory 304, storage 306, an interconnect interface 307, a user interface 308, and a network interface 310. In different embodiments, the system may omit any of these components or may include duplicates, or any additional numbers of, any of the components, as well as any other types of components to implement any of the methods and/or apparatus described in this disclosure.

In some embodiments, the interconnect interface 307 may be implemented with any type of general or storage interconnect such as SATA, SAS, NVMe, PCI, PCIe, and/or the like.

The CPU 302 may include any number of cores, caches, bus and/or interconnect interfaces and/or controllers. The Memory 304 may include any arrangement of dynamic and/or static RAM, nonvolatile memory (e.g., flash memory) etc. The storage 306 may include hard disk drives (HDDs), solid state drives (SSDs), and/or any other type of data storage devices or any combination thereof. The user interface 308 may include any type of human interface devices such as keyboards, mice, monitors, video capture or transmission devices, microphones, speakers, touchscreens, etc. as well as any virtualized or remote versions of such devices.

The network interface 310 may include one or more adapters or other apparatus to communicate through Ethernet, Fibre Channel, InfiniBand, TCP/IP, UDP/IP, RDMA, Wi-Fi, Bluetooth, or any other computer networking arrangement to enable the components to communicate through physical and/or logical networks, such as an intranet, the Internet, local area networks, wide area networks, etc.

Any or all of the components of the system 300 may be interconnected through a system bus 301 which may collectively refer to various interfaces including power buses, address and data buses, high-speed interconnects such as Serial AT Attachment (SATA), Peripheral Component Interconnect (PCI), Peripheral Component Interconnect Express (PCI-e), System Management Bus (SMBus), and any other types of interfaces that may enable the components to work together, either locally at one location, and/or distributed between different locations.

The system 300 may also include various chipsets, interfaces, adapters, glue logic, embedded controllers, such as programmable or non-programmable logic devices or arrays, application specific integrated circuits (ASICs), embedded computers, smart cards, and the like, arranged to enable the various components of the system 300 to work together to implement any or all of the methods and/or apparatus described in this disclosure. Any of the components of the system 300 may be implemented with hardware, software, firmware, or any combination thereof. In some embodiments, any or all of the components may be realized in a virtualized form and/or in a cloud-based implementation with flexible provisioning of resources, for example within a data center, or distributed throughout multiple data centers.

The operations, methods, algorithm and/or functions described in connection with the embodiments disclosed herein may be embodied directly in hardware, in one or more software modules executed by a processor, or in a combination of the two, including in the system 300. If implemented in software, functions may be stored or transmitted as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium. Any system disclosed herein, or component or portion thereof, may be implemented as a part of a software stack of a larger system, for example, storage system or other larger system. Any system disclosed herein, or component or portion thereof, may be implemented as its own software stack.

The embodiments disclosed herein may be described in the context of various implementation details, but the principles of this disclosure are not limited these or any other specific details. Some functionality has been described as being implemented by certain components, but in other embodiments, the functionality may be distributed between different systems and components in different locations and having various user interfaces. Certain embodiments have been described as having specific processes, steps, combinations thereof, and/or the like, but these terms may also encompass embodiments in which a specific process, step, combinations thereof, and/or the like may be implemented with multiple processes, steps, combinations thereof, and/or the like, or in which multiple process, steps, combinations thereof, and/or the like may be integrated into a single process, step, combinations thereof, and/or the like. A reference to a component or element may refer to only a portion of the component or element. The use of terms such as "first" and "second" in this disclosure and the claims may only be for purposes of distinguishing the things they modify and may not indicate any spatial or temporal order unless apparent otherwise from context. A reference to a first thing may not imply the existence of a second thing. Moreover, the various details and embodiments described above may be combined to produce additional embodiments according to the inventive principles of this patent disclosure.

Since the inventive principles of this patent disclosure may be modified in arrangement and detail without departing from the inventive concepts, such changes and modifications are considered to fall within the scope of the following claims.

The invention claimed is:

1. A method comprising:
transferring data between a host and a first storage device using a first connection;
transferring data between the host and a second storage device using a second connection; and
transferring, based on a performance parameter that is based on a bandwidth of at least one of the first connection, the second connection, or a third connection, data between the first storage device and the second storage device using the third connection;
wherein a determination to transfer the data, based on the performance parameter, is controlled, at least in part, by logic at the first storage device.

2. The method of claim 1, wherein the first storage device is configured for the performance parameter by at least one of the host, a management controller, the first storage device, or the second storage device.

3. The method of claim 1, wherein the performance parameter comprises at least one of a priority, a resource, a performance level, or a Quality-of-Service (QoS) parameter.

4. The method of claim 1, further comprising:
transferring data between the host and a third storage device using a fourth connection; and
configuring the first, second and third storage devices as at least one communication group.

5. The method of claim 1, wherein the first storage device performs at least one of a reliability function, an availability function, or a security function.

6. The method of claim 1, further comprising performing, by the first storage device, a service for the second storage device based on the performance parameter.

7. The method of claim 6, further comprising superseding the performance parameter.

8. The method of claim 1, wherein the performance parameter is a first QoS parameter, the method further comprising:
transferring data between the host and a third storage device using a fourth interface;
configuring the first storage device and the second storage device as a first communication group;
configuring at least two of the first storage device, the second storage device, and the third storage device as a second communication group; and
transferring data within the second communication group, using the third connection, based on a second QoS parameter.

9. The method of claim 8, wherein:
the first communication group performs a first operation based on the first QoS parameter; and
the second communication group performs a second operation based on the second QoS parameter.

10. The method of claim 1, wherein the performance parameter is based on a policy parameter.

11. A storage system comprising:
a host interface;
a first storage device having a first interface coupled to the host interface;
a second storage device having a second interface coupled to the host interface; and
a communication connection coupled between the first storage device and the second storage device, wherein the communication connection comprises a peer-to-peer bus;
wherein at least one of the first storage device or the second storage device is configured to determine, based on a performance parameter, to transfer data between the first storage device and the second storage device using the communication connection, the performance parameter being based on a bandwidth of at least one of the first interface, the second interface, or the communication connection.

12. The storage system of claim 11, wherein:
the first interface is coupled to the host interface using a first connector;
the second interface is coupled to the host interface using a second connector; and
the communication connection is coupled between the first connector and the second connector.

13. The storage system of claim 11, wherein the communication connection comprises a switch fabric.

14. The storage system of claim 11, wherein the communication connection is located at least partially on one of a midplane, a motherboard, or a switchboard.

15. The storage system of claim 11, wherein a flow control associated with the performance parameter comprises an acknowledgment.

16. The storage system of claim 15, wherein the flow control comprises a message sequence.

17. A storage device comprising:
a storage medium;
a storage device controller coupled to the storage medium;
a storage interface coupled to the storage device controller;
a communication interface coupled to the storage device controller; and
logic configured to control, based on a performance parameter that is based on a bandwidth of at least one of the storage interface or the communication interface, a data transfer using the communication interface, wherein a determination to transfer data is controlled, at least in part, by the logic of the storage device.

18. The storage device of claim 17, wherein the storage interface comprises a two-port interface.

19. The storage device of claim 17, further comprising a first connector coupled to the storage interface, wherein the first connector is coupled to the communication interface.

20. The storage device of claim 19, further comprising a second connector coupled to the communication interface.

* * * * *